United States Patent [19]
Cordova et al.

[11] Patent Number: 5,371,593
[45] Date of Patent: Dec. 6, 1994

[54] SENSOR COIL FOR LOW BIAS FIBER OPTIC GYROSCOPE

[75] Inventors: Amado Cordova, West Hills; Donald J. Bilinski, Northridge; Samuel N. Fersht, Studio City; Glenn M. Surabian, West Hills; John D. Wilde, Woodland Hills; Paul A. Hinman, San Pedro, all of Calif.

[73] Assignee: Litton Systems, Inc., Beverly Hills, Calif.

[21] Appl. No.: 938,294

[22] Filed: Aug. 31, 1992

[51] Int. Cl.$^5$ .............................................. G01C 19/72
[52] U.S. Cl. ................................... 356/350; 242/159; 242/46.21; 356/326
[58] Field of Search ............... 356/350, 326; 242/159, 242/46.21

[56] References Cited
U.S. PATENT DOCUMENTS

| | | | |
|---|---|---|---|
| 4,013,365 | 3/1977 | Vali et al. | 356/350 |
| 4,743,115 | 5/1988 | Arditty et al. | 356/350 |
| 4,781,461 | 11/1988 | Baron et al. | 356/350 |
| 4,793,708 | 12/1988 | Bednarz | 356/350 |
| 4,809,244 | 2/1989 | Penneck et al. | 367/162 |
| 4,856,900 | 8/1989 | Ivancevic | 356/350 |
| 5,162,868 | 11/1992 | Ando | 356/326 |
| 5,168,539 | 12/1992 | Negishi et al. | 356/350 |

Primary Examiner—Samuel A. Turner
Assistant Examiner—LaCharles Keesee
Attorney, Agent, or Firm—Elliott N. Kramsky

[57] ABSTRACT

A sensor coil for a fiber optic gyroscope. The coil is formed on a spool of carbon composite material or of another material whose coefficient of thermal expansion approximates that of the overlying windings of the glass optical fiber. The windings are potted in an adhesive material. Various bias effects are addressed by the coil design. The close matching of the thermal expansion characteristics of the spool and the fiber windings as well as proper selection of the coil potting material minimize the Shupe-like bias caused by thermal stress that would be otherwise exerted by a standard metallic spool. By careful selection of potting material (particularly its modulus of elasticity) vibration-induced bias, coil cracking, degradation of h-parameter and temperature-ramp bias sensitivity are also minimized.

13 Claims, 6 Drawing Sheets

ADHESIVES INVESTIGATION

| ADHESIVE | E (psi) | α (ppm/°C) | (T-Tc)MAX (°C) | αE(T-Tc)MAX (psi) | COMMENTS |
|---|---|---|---|---|---|
| NORLAND 83H | ~200 000 | ~120 | 160 | 3840 | EXCELLENT VIBRATION PERFORMANCE BUT SOME COILS HAD CRACKED |
| SCOTCH CAST 235 | ~40 000 | ~200 | 150 | 1200 | CANDIDATE ADHESIVE, DRY-WIND, VACUUM IMPREGNATION OF 200 M COIL HAS BEEN DEMONSTRATED |
| NORLAND 65 | ~20 000 | ~200 | 80 | 320 | CANDIDATE ADHESIVE, U.V. CURABLE |

SENSOR COIL FOR LOW BIAS FIBER OPTIC GYROSCOPE

BACKGROUND

1. Field of the Invention

The present invention relates to fiber optic gyroscopes. More particularly, this invention pertains to an improved sensor coil design that addresses factors contributing to various bias errors and minimizes gyro bias sensitivity to dynamic thermal and vibration environments.

2. Description of the Prior Art

A fiber optic gyroscope comprises the following main components: (1) a light source, (2) a beamsplitter (either a fiber optic directional coupler or an integrated-optics Y-junction), (3) a fiber optic coil, (4) a polarizer (and sometimes one or more depolarizers), and (5) a detector. Light from the light source is split by the beamsplitter into copropagating and counterpropagating waves travelling in the sensing coil. The associated electronics measures the phase relationship between the two interfering, counter-propagating beams of light that emerge from opposite ends of the coil. The difference between the phase shifts experienced by the two beams provides a measure of the rate of rotation of the platform to which the instrument is fixed.

Environmental factors can affect the measured phase shift difference between the counterpropagating beams, thereby introducing a bias error. Such environmental factors include variables such as temperature, vibration (acoustical and mechanical) and magnetic fields. Such factors are both time-varying and unevenly distributed throughout the coil. These environmental factors induce variations in the optical light path that each counterpropagating wave encounters as it travels through the coil. The phase shifts induced upon the two waves are unequal, producing a net undesirable phase shift which is indistinguishable from the rotation-induced signal.

One approach to attain a reduction of sensitivities arising from environmental factors has involved the use of various symmetric coil winding configurations. In such coils, the windings are arranged so that the geometrical center of the coil is located at the innermost layer while the two ends of the coil are located at the outermost layers.

N. Frigo has proposed the use of particular winding patterns to compensate for non-reciprocities in "Compensation of Linear Sources of Non-Reciprocity in Sagnac Interferometers". *Fiber Optics and Laser Sensors I*, Proc. SPIE Vol. 412 p. 268 (1993). Furthermore, U.S. Pat. No. 4,793,708 of Bednarz entitled "Fiber Optic Sensing Coil" teaches a symmetric fiber optic sensing coil formed by dualpole or quadrupole winding. The coils described in that patent exhibit enhanced performance over the conventional helix-type winding.

U.S. Pat. No. 4,856,900 of Ivancevic entitled "Quadrupole-Wound Fiber Optic Sensing Coil and Method of Manufacture Thereof" teaches an improved quadrupole-wound coil in which fiber pinching and microbends due to the presence of pop-up fiber segments adjacent the end flanges are overcome by replacing such pop-up segments with concentrically-wound walls of turns for climbing between connecting layers. Both of the aforementioned U.S. patents are the property of the assignee herein.

While appropriate coil winding techniques minimize some of the bias errors found in the output of a fiber optic gyro, they are not capable of eliminating all of such errors. In particular, the design of the gyro sensor coil can impact the gyro's random walk, bias stability, bias temperature sensitivity, bias temperature-ramp sensitivity, bias vibration sensitivity, bias magnetic sensitivity, scale factor temperature sensitivity, scale factor linearity and input axis temperature sensitivity.

SUMMARY OF THE INVENTION

The foregoing and additional shortcomings and disadvantages of the prior art are addressed by the present invention that provides a sensor coil for a fiber optic gyroscope. Such a coil includes optical fiber. The fiber is arranged into a plurality of concentric cylindrical layers. Each of the layers comprise a plurality of turns of the fiber and each of the turns is arranged in a predetermined winding pattern. The turns are encapsulated by a potting material of predetermined composition.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

DETAILED DESCRIPTION

Figure 1:
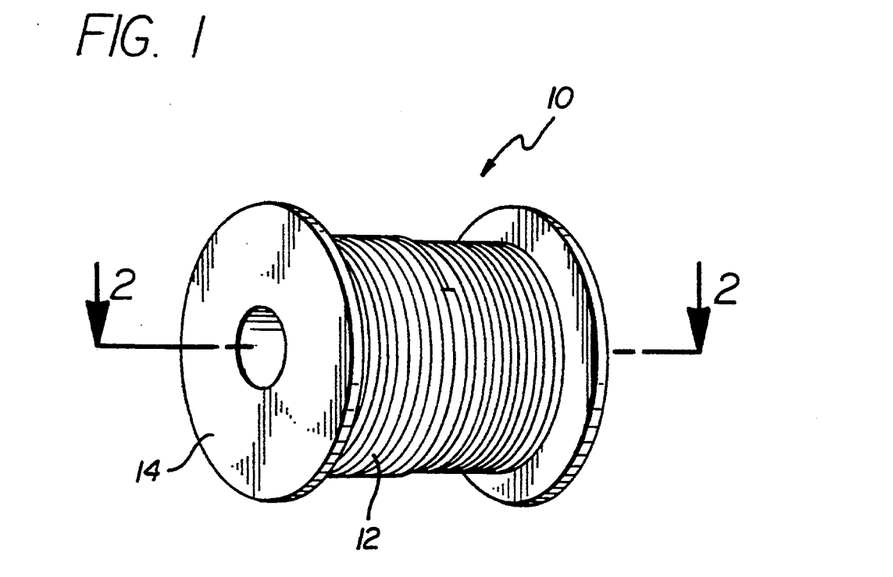
FIG. 1 is a perspective view of a sensor coil for a fiber optic gyroscope in accordance with the invention.

Turning to the drawings, FIG. 1 is a perspective view of a sensor coil 10 in accordance with the present invention. As mentioned earlier, the sensor coil 10 provides a critical element of a fiber optic gyro system. In use, it is rigidly fixed to a platform whose rotation rate is to be measured.

The sensor coil 10 is a particular example of a coil in accordance with the invention. It comprises an optical fiber 12 that is wound upon a supportive spool 14 and serves as an optical guide for receiving a counterpropagating beam pair emitted from a common light source (not shown). The supportive spool 12 in FIG. 1 shows flanges. However, the presence of flanges is not required in this invention.

Figure 2:
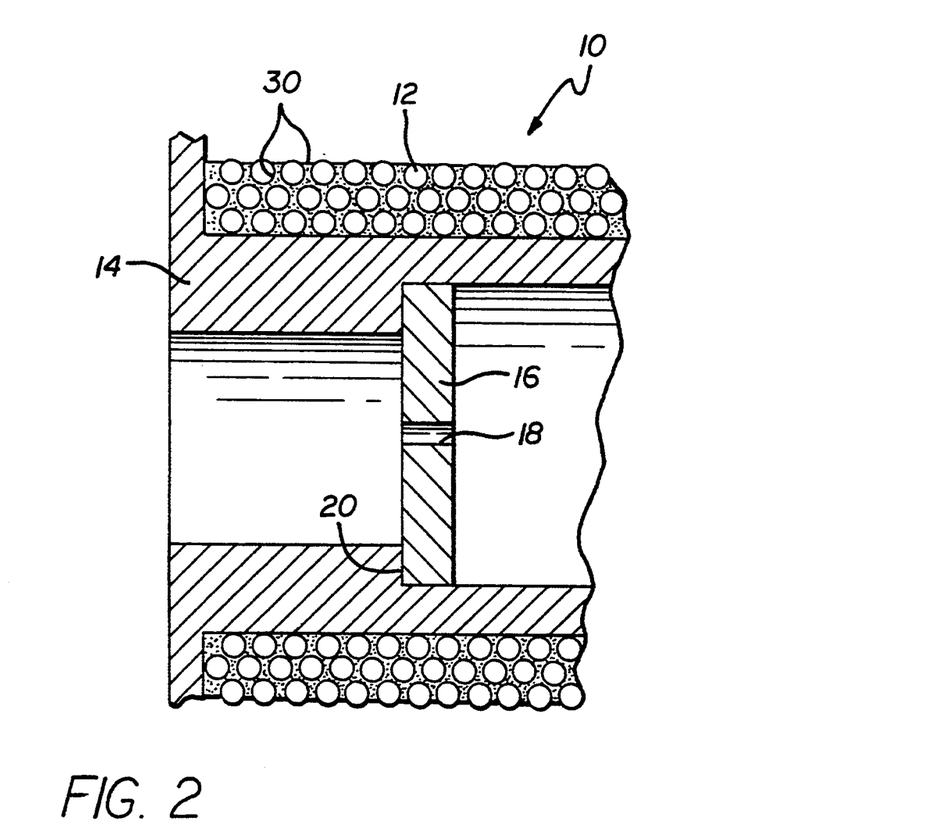
FIG. 2 is a cross-sectional view of the sensor coil of the invention taken at line 2—2 of FIG. 1.

FIG. 2 is a cross-sectional view of coil 10, a particular example of a sensor coil in accordance with the invention, taken at line 2—2 of FIG. 1. As can be seen, a disk-like support 16 is press-fit within the spool 14. The support 16 has a central aperture 18 for receiving a fastener whereby the sensor coil 10 can be tightly secured to the platform. An annular shoulder 20, formed at the inner surface of the spool 14, acts as a stop to maintain the position of the support.

In contrast to a conventional aluminum or like spool for a rotation rate sensor, the spool 14 (including the support 16) is of a carbon composite material or another material with similar thermomechanical properties. Such material includes woven carbon fibers of the high modulus pitch type such as those commercially available from such sources as the Amoco Corporation under the trademarks "P-25", "P-55", "P-100" or the like. Such fibers are made of petroleum pitch as opposed to PAN (poly acrilyl nitryl) or rayon fibers and are characterized by a high modulus of elasticity and high thermal conductivity. The above-noted trademarks correspond to the modulus of elasticity of the carbon fibers. Thus, fibers marketed under "P-25" have a modulus of elasticity of approximately 25,000,000 p.s.i., those marketed as "P-55" are characterized by a modulus elasticity of approximately 55,000,000 p.s.i. and "P-100" fibers have a modulus elasticity of approximately 100,000,000 p.s.i. The relationship of such trademark notations of to the modulus of elasticity that characterizes the carbon fiber product is well known to those in the art. It is further well understood by those in the art that "high modulus pitch fibers" is a term generally associated with fibers that possess a modulus of elasticity exceeding approximately 50,000,000 psi. The spool 14 is formed of such fibers which have been built up into multiple fiber layer tubes or panels by means of a bonding matrix of, for example, but limited to phenolic material. The spool 14 can be formed from such cylinders or panels by a number of known processes including, for example, cutting sections therefrom. Alternatively, the woven fiber can be arranged into predetermined orientations and shapes in a die and the bonding material cast around it. Another process employs transfer molding in which the chopped fiber is mixed with a transfer molding material and then transferred or pressure injected into a transfer mold. The plys of preimpregnated fabric are preferably oriented at right angles within the composite material, aligned both longitudinally and circumferentially with respect to the spool's axis of rotation 22. By so orienting the fibers, the spool 14 will expand in a predictably favorable manner both longitudinally and radially with temperature based upon the relative numbers of fibers oriented in the orthogonal directions.

The inventors have developed a theoretical model of bias non-reciprocities in the fiber optic gyroscope. In particular, they have found that gyro bias errors under a dynamic thermal environment can be due to thermal stress. This effect is very similar to the standard temperature Shupe effect reported in "Thermally Induced Non-Reciprocity in the Fiber Optic Interferometer", D. M. Shupe, *Applied Optics*, Vol. 19, p. 654 (1980). One of the drivers of this thermal-stress induced bias error is the thermal mismatch that exists between the glass optical fiber and the metallic spool. That is, the bias error results partly from the thermal stress exerted upon the coil windings through mismatched thermal expansions of the metallic spool (greater expansion) and the glass fiber (lesser expansion). Another driver is thermal stress due to expansion/contraction of the coil potting material (discussed below). The differences between the standard temperature-Shupe effect and the thermal-stress induced Shupe effect are clearly noticeable when a coil is subjected to a steady-state temperature ramp. While the bias error due to the standard Shupe effect dies away as soon as the temperature gradients become constant with time, the bias error due to the thermal-stress effect is non-zero as long as the temperature of the coil is changing and that effect remains even after the temperature gradients have reached steady-state. Contrasting the effects, the standard Shupe effect is mainly a function of the rate of change of the temperature gradients across the coil while the thermal-stress induced Shupe effect is mainly a function of the rate of change of the coil average temperature.

In the present invention, as a result of careful selection of the carbon composite material of the spool 14, its coefficient of thermal expansion may be made to closely match the coefficient of the windings of the glass optical fiber 12, thereby, minimizing thermal stress on the optical fiber. This is in contrast to the design of sensor coils in accordace with the pior art in which the optical fiber is conventionally wound upon an aluminum spool. As discussed below, careful selection of the coil potting material can also reduce thermal stresses in the optical fiber.

Figure 3:
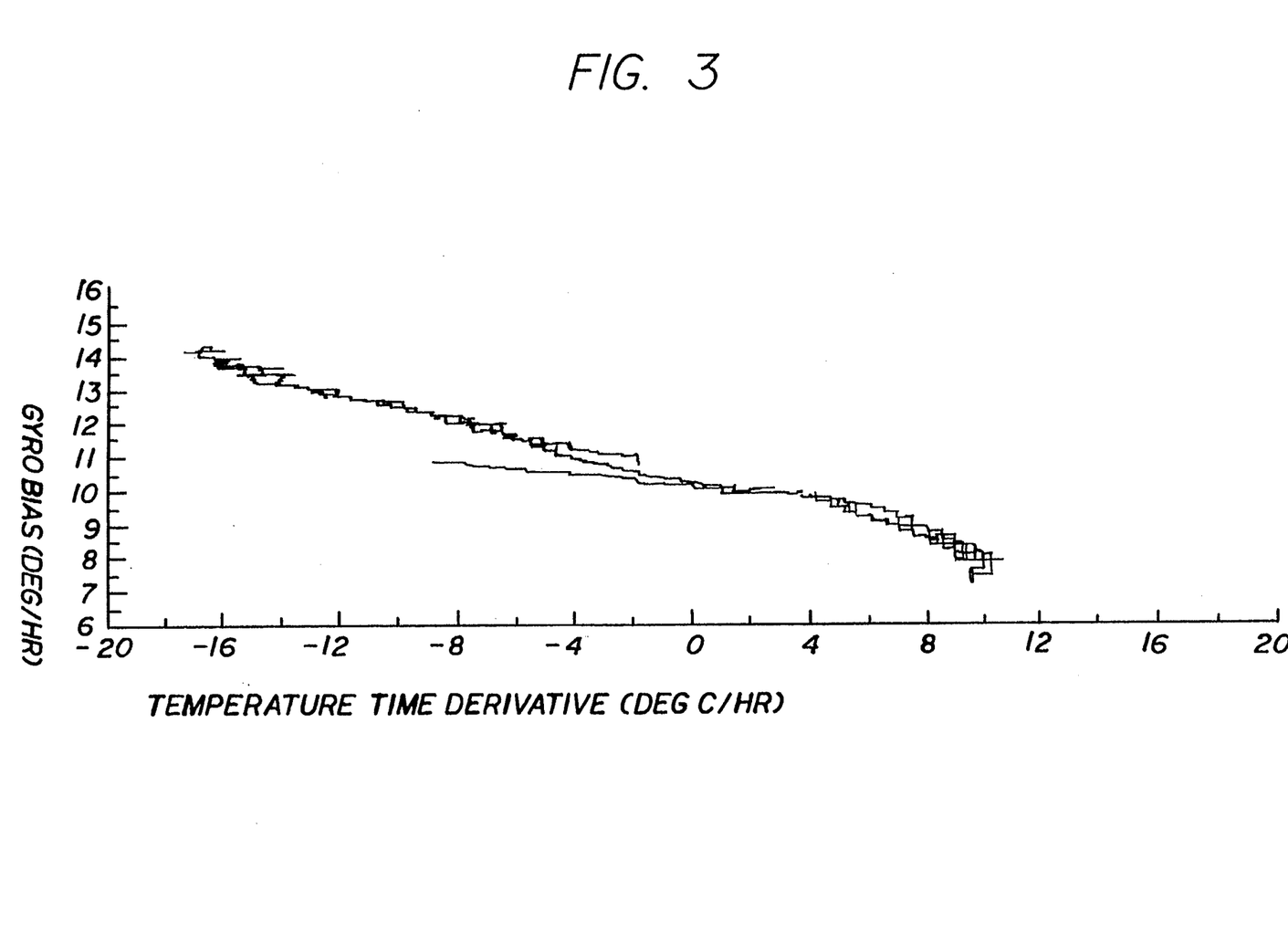
FIG. 3 is a graph of the gyro bias versus the temperature rate of change (or temperature time-derivative) for a coil made in accordance with the prior art, that is, a dry-wind in an aluminum spool. The slope of this curve is referred to as the "Shupe coefficient" and has units of bias change (deg/hr) per rate of temperature change (degC./hr)
Figure 4:
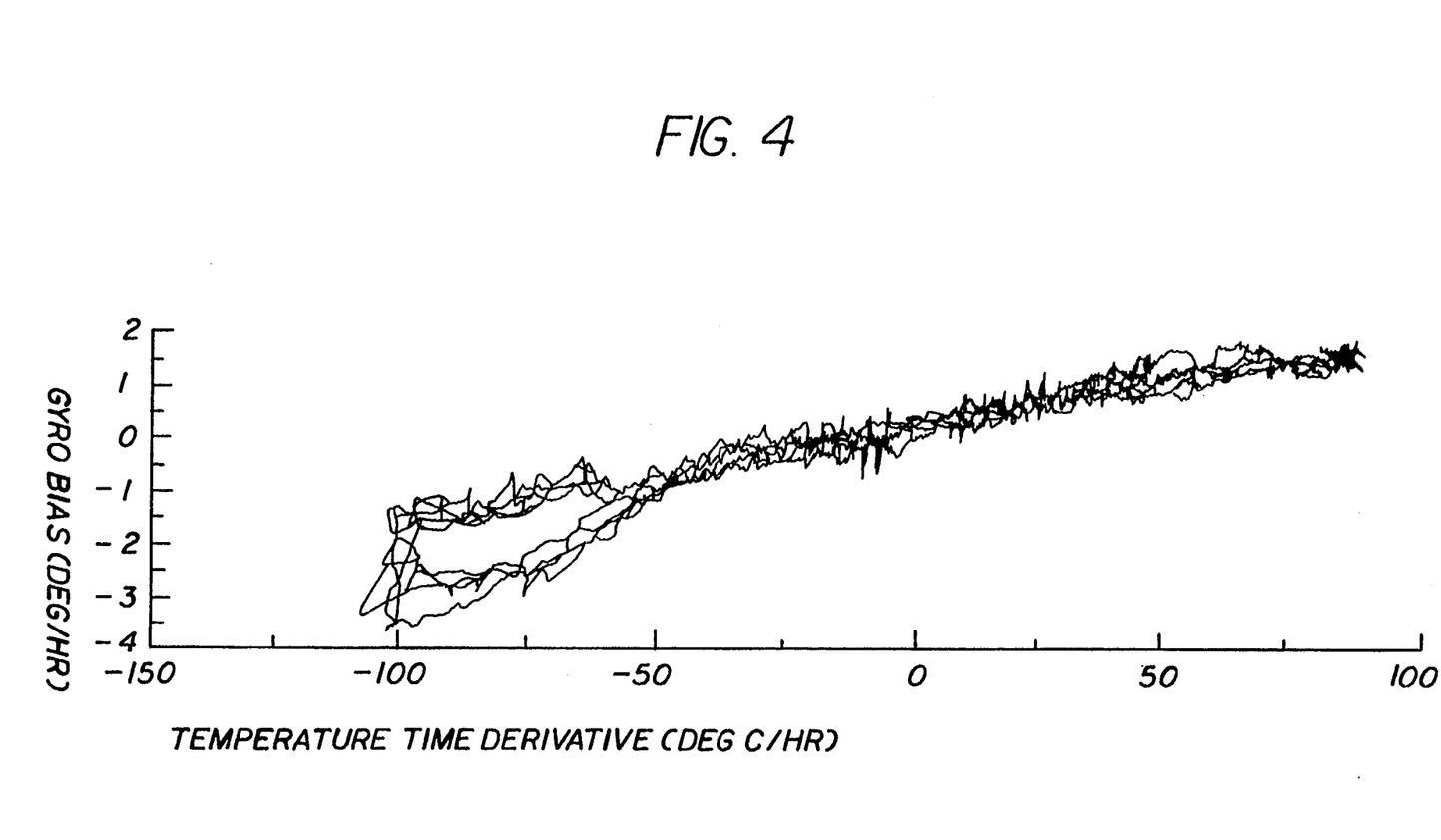
FIG. 4 is a graph of the gyro bias versus the temperature rate of change for a coil made in accordance with this invention, that is, a potted coil on a carbon composite spool.

FIG. 3 is a graph of the gyro bias error versus rate of change of temperature (temperature time derivative) for a coil made in accordance with the prior art. The data were taken from a sensor coil formed of 0.06 inch thick aluminum. Approximately 200 m of 185 micron wide optical fiber was wound thereon in a symmetric pattern. As predicted by the model developed by the inventors, the Shupe-effect bias is predominantly linear with the temperature time derivative. The slope of the curve has been designated the "Shupe coefficient" by the inventors and is a direct indication of the coil and the gyro bias sensitivity to temperature ramps. For a coil made in accordance with the prior art, the Shupe coefficient is large, 0.22 (deg/hr)/(degC./her) in FIG. 3. Many coils wound on aluminun spools were measured to have Shupe coefficients between 0.1 and 0.4. In contrast, potted coils wound on carbon-composite spools exhibit a significant reduction in the Shupe coefficient. FIG. 4 is a graph of the gyro bias error versus the temperature rate of change for a coil made in accordance with this invention. This data was taken from a sensor coil approximately 200 m long, consisting of 165 micron fiber wound on a carbon composite spool and potted with an UV-cured adhesive. The Shupe coefficient of this coil is about one order of magnitude lower than that of prior art coils.

Figure 5:
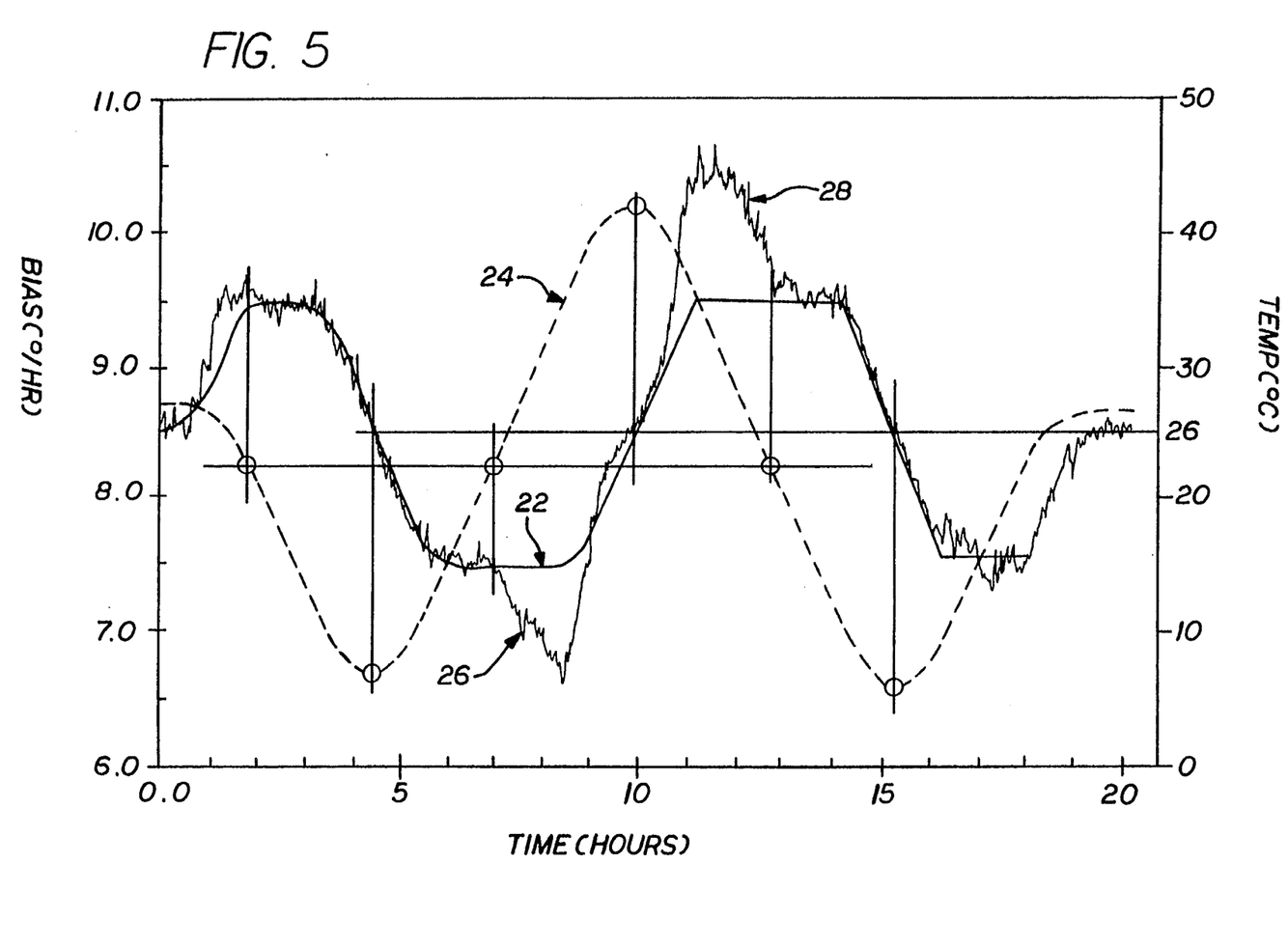
FIG. 5 shows graphs of the output bias of a fiber optic gyroscope versus time and of the gyroscope temperature versus time for a coil made in accordance with the prior art (aluminum spool)

In addition to the linear dependence of the bias with the temperature rate of change predicted by the inventors' model, they have experimentally found that significant second order effects can also be observed in coils made in accordance with the prior art and such effects are also a function of temperature. FIG. 5 shows graphs of the outpt bias of a fiber optic gyroscope versus time and of the gyroscope temperature versus time. These two graphs reveal the relationship between gyroscope output bias and temperature. This data was taken from a sensor coil having a spool formed of 0.06 inch thick aluminum in accordance with the prior art. Approximately 1000 m of 185 micron fiber was wound thereon in a symmetric pattern. The variation of coil temperature (or temperature profile) is shown by the curve 24. The solid line or curve 22 is a plot of the time derivative of the temperature profile. As can be seen from the graph, significant departures from the linear dependence of the bias with the temperature rate of change were measured at the areas 26 and 28. The inventors believe that these significant departures are due to a second order thermal-stress induced Shupe effect. Large second order effects are not observed in coils made in accordance with this invention when the potting material is properly selected (see below).

Figures 6, 7:
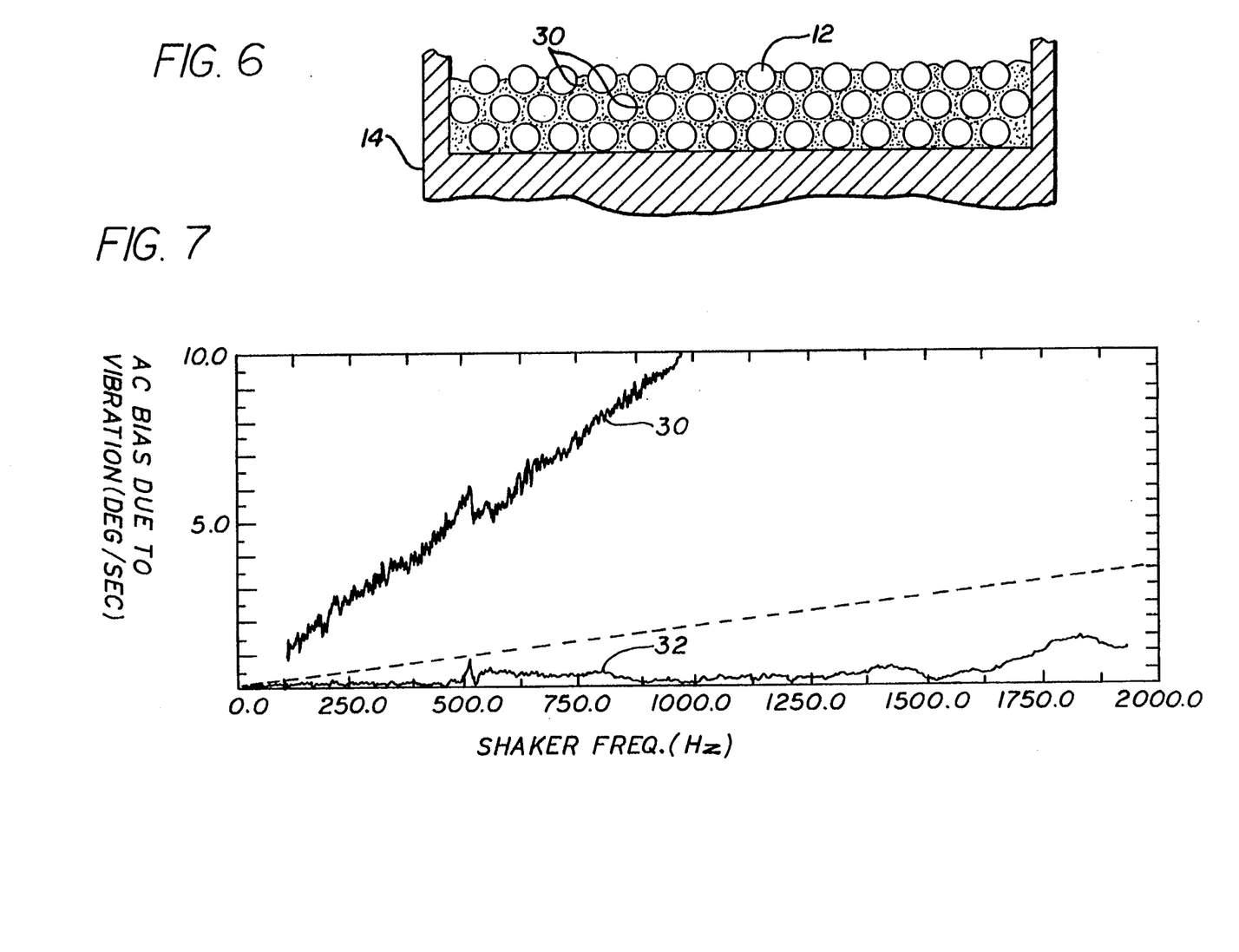
FIG. 6 is an enlarged cross-sectional view of a representative portion of the layered windings of a sensor coil in accordance with the invention.
FIG. 7 is a graph of the relationship between frequency of axial vibration and A.C. bias for two potted sensor coils.

Other features of the invention address additional sources of bias. FIG. 6 is an enlarged cross-sectional view of a representative portion of the layered windings of optical fiber 12 that form the optical guide of the gyro.

As can be seen in FIG. 6, the windings of optical fiber 12 are potted within a matrix of adhesive material 30. Generally, the presence of such adhesive material 30 provides a number of useful advantages for the gyro. These include facilitating the precision of coil winding. That is, the adhesive potting material 30 can be applied and cured layer-by-layer so that smooth surfaces will be presented for the winding of subsequent layers. Such a winding environment enhances control of the resulting coil geometry including such essential factors as inter-fiber spacing, turns per layer and layers per coil minimizing the presence of winding defects such as "missing turns".

Various manufacturing methods can be employed to create a coil in which the turns or windings are embedded in a matrix of adhesive potting material. Such methods include, for example, application of the adhesive by means of a syringe-type dispenser followed by curing. Such methods assure that smooth surfaces will be presented for the winding of subsequent layers. A uv-curable adhesive which permits rapid hardening is most appropriate for such methods.

Other methods of manufacture include dry coil winding followed by vacuum impregnation with a very low viscosity adhesive. An alternative wet winding technique employs a thermally-curable adhesive that is applied as the coil is wound. The adhesive is left uncured (in liquid form) during winding. The completed (wound) coil is then thermally cured.

While the potting of the coil is seen to provide the above-identified benefits, the inventors have found that the design of the potting material matrix, including the type of adhesive potting material employed, can be manipulated to improve the performance of the gyro significantly. In particular, as demonstrated below, careful selection of adhesive potting material 30 for encapsulating the coil can significantly reduce the sensitivity of the sensor coil 10 to vibration-induced bias errors.

The inventors have found that gyro vibration sensitivity can be minimized in a potted sensor coil through careful selection of the potting adhesive. The vibration sensivity of a potted sensor coil results from processes within the coil that introduce a non-reciprocal phase error into the output that is indistinguishable from the rotation rate signal. The bias vibration sensitivity is caused by a non-reciprocal phase shift in the counter-propagating waves that, in turn, results from changes in fiber length and refractive index brought about by vibration dynamic strains via the photoelastic effect. This bias error is similar in nature to the Shupe bias error described earlier, the main difference being that the environmental perturbation is vibratory strain rather than changing temperature. It has been observed experimentally that, when resonance frequencies are greatly removed from the instrument performance bandwidth (and the noise factor is negligible), the open loop response of gyro output to a sinusoidal vibration sweep is a linear function of vibration frequency.

This is true when the direction of vibration is either parallel to the coil input axis (axial vibration) or perpendicular to it (transverse vibration). The inventors have theoretically and experimentally found that the fiber optic gyro bias vibration sensitivity is a linear function of vibration frequency. Furthermore, they have found that, under transverse vibration, gyro output exhibits an azimuthal dependence that is nearly sinusoidal, (i.e., varies as the SIN of the azimuth angle.)

The consequences of the vibration dependence are significant. Even though a direct D.C. bias effect, called "D.C. rectification," has not been observed, saturation of the electronic components can prevent the closed-loop electronics from monitoring the rotation rate at certain vibration frequencies. This can be manifested as an apparent D.C. rectification. Angle rate noise may also result from the vibration as well as pseudo-coning at the system level.

The inventors have found that the above-described vibration-associated problems may be minimized or eliminated by arranging the matrix comprising potting adhesive and fiber windings so that the vibration dynamic stresses experienced in the fiber windings are minimized. High stresses and strains in the fiber core are produced by dynamic amplification. The inventors have further found that this harmful dynamic amplification effect can be traced to the use of an adhesive potting material of insufficient elastic stiffness.

Accordingly, the present invention addresses the problem of vibration-induced bias error, firstly, by providing that the design of the dynamic system that includes the spool, windings, adhesive potting medium and coil mount possesses a natural resonant frequency that is outside the operational bandwidth of the gyro.

Second, the effects of vibration-induced bias error are also reduced through the use of a potting material that is capable of meaningfully sharing dynamic loads with the fiber to reduce the vibratory stresses and strains in the fiber.

The inventors have found that vibration-induced bias errors may be reduced by employing adhesive potting material having a relatively-high Young's modulus (i.e. "stiff" material). FIG. 7 contains graphs of the relationship between the vibration-induced A.C. bias amplitude for two potted sensor coils and the frequency of axial vibration. In the graph, the curve 30 presents the relationship between bias error and vibration frequency for a gyro utilizing a sensor coil with fiber windings potted in an adhesive characterized by a Young's modulus of less than 300 p.s.i. As can be seen, the relationship between the axial vibration frequency and A.C. bias effect is substantially linear, reaching 10.0 degrees per second as the shaker frequency swept from 0 to 1000 Hz.

The curve 32 presents the relationship between bias error and axial shaker frequency for a gyro having a sensor coil potted in an adhesive matrix of material of Young's modulus in excess of 100,000 p.s.i. As can be seen from this curve a dramatic and substantial improvement in the performance is obtained by increasing the stiffness of the potting material. When compared to the bias error for a low modulus material as shown by the curve 30, the A.C. bias that results from axial vibration is relatively negligible as the shaker frequency is swept from 0 to nearly 2000 Hz. Similar results have been obtained relating A.C. bias to transverse vibrations. Thus the data confirms that, by increasing the stiffness of the potting material, the mechanical stresses imposed by vibration will be shared to a greater extent by the potting material and therefore they will be somewhat removed from the optical fiber. Significantly reduced sensitivity of gyro output to vibration can be observed when potting material of a large Young's modulus is employed.

While the benefit of potting the fiber coil windings in a high modulus material to minimize bias effects due to vibration are clear, the inventors have further determined that the stiffness of potting material must be tempered in view of a number of factors. As the stiffness of the potting material increases, the coil becomes subject to greater thermal stress in response to changes in temperature well above or well below the (minimum stress) curing temperature $T_c$. Such excessive thermal stressing of the sensor coil can produce the problems of coil cracking, h-parameter (polarization cross-coupling) degradation and large bias temperature-ramp sensitivity. H-parameter degradation is only important, of course, when the coil is made of polarization maintaining fiber. Coil cracking and degraded h-parameter performance have been observed in a 200 meter potted coil design utilizing a very stiff potting material.

The coil cracking, h-parameter and temperature-ramp sensitivity problems are all affected by the choice of potting material since, as mentioned above, thermal stress is a function of the modulus of the potting material. Thermal stress $\sigma$ is proportional to $\alpha E(T-T_c)$ where $\alpha$ is the difference between the coefficients of thermal expansion of the adhesive and the optical fiber, E is the elastic modulus of the adhesive material and $T-T_c$ is the temperature excursion from the adhesive curing temperature $T_c$. Stated in terms of design considerations, an optimum adhesive for use as the coil potting material should be one for which the thermal stress $\sigma$ is minimized or made as small as possible over the maximum foreseen temperature excursion $T-T_c$ while E is maintained as large as possible to minimize vibration-induced bias effects.

Figure 8:
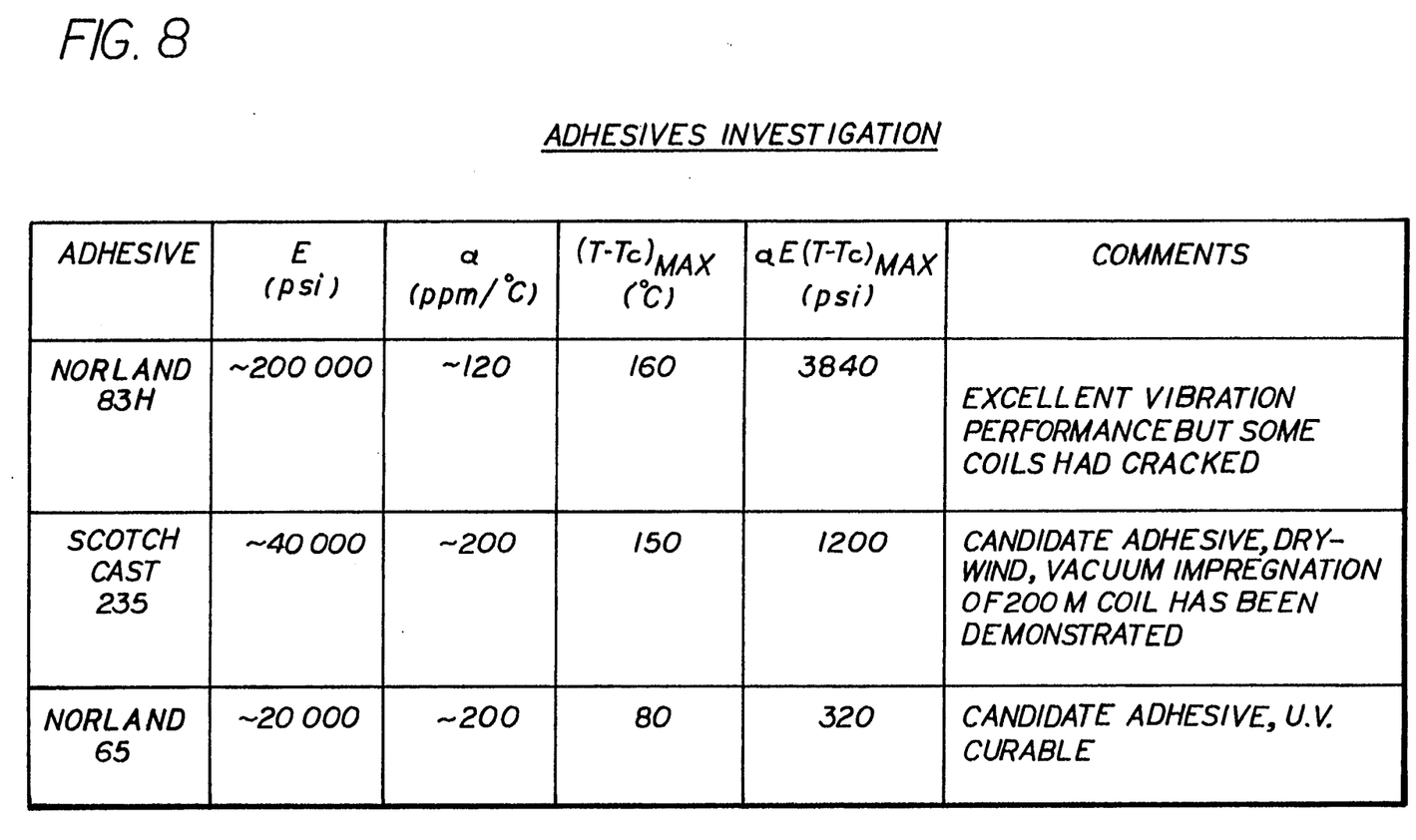
FIG. 8 is a table of values for judging the appropriateness of sensor coil potting material in accordance with the invention.

FIG. 8 is a table that presents data for evaluating the suitability of various adhesive potting materials. As can be seen, the adhesive marketed under the trademark "NOA 83 H" of Norland, which possesses a relatively-high elastic modulus E of 200,000 p.s.i. is predictably characterized by excellent vibration performance but sensor coils utilizing such potting material have experienced some cracking. This adhesive exerts a maximum stress $\sigma$ over a 160 degree Centigrade excursion of 3840 p.s.i. On the other hand, "SCOTCH CAST 235" of Minnesota Mining and Manufacturing Corporation, which has an elastic modulus of approximately 40,000 p.s.i. exerts a maximum stress of 1200 p.s.i. and "NOA 65" (Norland 65), which possesses an elastic modulus of about 20,000 p.s.i., exerts a maximum stress of 320 p.s.i. over an 80 degree Centigrade thermal excursion. The inventors have found that adhesives having Young's modulus between 1,000 and 20,000 p.s.i. are adequate to fulfill both the bias vibration requirement and low thermal stress.

Thus, it is seen that the teachings of the present invention provide sensor coils that are substantially improved in terms of minimization of bias sensitivities due to dynamic thermal and vibration environments. By utilizing the teachings of the invention, one can obtain gyro performance that is substantially less subject to bias errors of environmental origin that were formerly unrecognized or unaddressed by the prior art.

While this invention has been described with reference to its presently preferred embodiment, it is not limited thereto. Rather, this invention is limited only insofar as defined by the following set of patent claims and includes within its scope all equivalents thereof.

What is claimed is:

1. A sensor coil for a fiber optic gyroscope for achieving an output in which vibration-induced bias is limited to a predetermined level comprising, in combination:
   a) an optical fiber;
   b) said fiber being arranged into a plurality of concentric cylindrical layers;
   c) each of said layers comprising a plurality of turns of said fiber;
   d) each of said turns being arranged into a predetermined winding pattern;
   e) each of said turns being encapsulated by a potting material of predetermined composition; and
   f) the modulus of elasticity of said potting material being of a sufficient value so that said predetermined level of vibration induced bias in the gyro output is obtained.

2. A sensor coil as defined in claim 1 further characterized in that:
   a) said turns of said fiber are supported by an inner spool; and
   b) said spool is of carbon composite material.

3. A sensor coil as defined in claim 2 wherein said spool further includes:
   a) a generally cylindrical body having a hollow interior;
   b) the interior of said body-having an annular shoulder; and
   c) a disk shaped support abuts said shoulder for fastening said coil to a platform.

4. A sensor coil as defined in claim 3 wherein said carbon composite material comprises carbon fibers embedded in a bonding matrix.

5. A sensor coil as defined in claim 4 wherein said fibers are preferentially oriented within said composite material.

6. A sensor coil as defined in claim 5 wherein said fibers are oriented substantially longitudinally and circumferentially with respect to the axis of rotation of said substantially cylindrical body.

7. A sensor coil as defined in claim 4 wherein said bonding matrix comprises resinous material.

8. A sensor coil as defined in claim 7 comprising fibers of modulus of elasticity of approximately 25,000,000 p.s.i.

9. A sensor coil as defined in claim 7 comprising fibers of modulus of elasticity of approximately 55,000,000 p.s.i.

10. A sensor coil as defined in claim 7 comprising fibers of modulus of elasticity of approximately 100,000,000 p.s.i.

11. A sensor coil as defined in claim 1 wherein said potting material is characterized by a modulus of elasticity such that coil cracking, h-parameter degradation and bias temperature-ramp sensitivity fall within predetermined limits.

12. A sensor coil as defined in claim 11 wherein the modulus of elasticity of said potting material is between 1,000 p.s.i. and 20,000 p.s.i.

13. A sensor coil as defined in claim 7 comprising pitch fibers characterized by a modulus of elasticity that exceeds 50,000,000 p.s.i.

* * * * *